(12) United States Patent
Pollack et al.

(10) Patent No.: US 8,103,824 B2
(45) Date of Patent: Jan. 24, 2012

(54) METHOD FOR SELF OPTIMIZING VALUE BASED DATA ALLOCATION ACROSS A MULTI-TIER STORAGE SYSTEM

(75) Inventors: Kristal Pollack, San Francisco, CA (US); Elizabeth Richards, Columbia, MD (US); Sandeep Uttamchandani, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 933 days.

(21) Appl. No.: 12/105,245

(22) Filed: Apr. 17, 2008

(65) Prior Publication Data

US 2009/0327618 A1    Dec. 31, 2009

(51) Int. Cl.
*G06F 12/00* (2006.01)
*G06F 13/00* (2006.01)
*G06F 13/28* (2006.01)
(52) U.S. Cl. ............................................ 711/114; 714/2
(58) Field of Classification Search ................... 711/114; 714/2
See application file for complete search history.

(56) References Cited

U.S. PATENT DOCUMENTS

| | | | |
|---|---|---|---|
| 6,108,736 A | 8/2000 | Bell | |
| 6,321,317 B1 | 11/2001 | Borowsky et al. | |
| 6,647,474 B2 | 11/2003 | Yanai et al. | |
| 6,728,831 B1 * | 4/2004 | Bridge | 711/114 |
| 7,275,138 B2 | 9/2007 | Saika | |
| 7,680,938 B2 * | 3/2010 | Oesterreicher et al. | 709/226 |
| 2003/0135385 A1 | 7/2003 | Karpoff | |
| 2004/0122950 A1 * | 6/2004 | Morgan et al. | 709/226 |
| 2005/0102547 A1 | 5/2005 | Keeton et al. | |

* cited by examiner

*Primary Examiner* — Matthew Bradley
*Assistant Examiner* — Chad Davidson
(74) *Attorney, Agent, or Firm* — Lieberman & Brandsdorfer, LLC

(57) ABSTRACT

A method, apparatus, and article of manufacture are provided to support dynamic assignment of data from a continuous stream of data to one or more storage devices in a storage network. The storage network is configured with one or more tiers in a hierarchy, with at least one storage device in each tier. Similarly, the storage network is in communication with both a storage manager and a data manager. The storage manager sorts the storage devices, maintains a demand function of each device, and calculates a burn rate for each storage device. The data manager is in communication with the storage manager and assigns data from the received stream of data to at least one of the storage devices.

20 Claims, 3 Drawing Sheets

METHOD FOR SELF OPTIMIZING VALUE BASED DATA ALLOCATION ACROSS A MULTI-TIER STORAGE SYSTEM

This invention was made with Government support under Contract No. H98230-05-3-0001 awarded by Intelligence Agency. The Government has certain rights in the invention.

BACKGROUND OF THE INVENTION

1. Technical Field

This invention relates to a method, system, and article for managing storage of a continuous stream of data where each data object has a value assigned thereto, wherein different data objects may have different data values. More specifically, the invention pertains to a heterogeneous storage system employed to store received data.

2. Description of the Prior Art

In a distributed computer system with shared persistent storage, one or more server nodes are in communication with one or more client nodes. FIG. 1 is a block diagram (10) illustrating one example of a distributed computer system. As shown, there are two server nodes (12) and (14), three client nodes (16), (18), and (20), and a storage area network (5) that includes one or more storage devices (not shown). Each of the client nodes (16), (18), and (20) may access an object or multiple objects stored on the file data space (27) of the storage area network (5), but may not access the metadata space (25). In opening the contents of an existing file object on the storage media of the storage device in the storage area network (5), a client contacts the server node to obtain metadata and locks. Metadata supplies the client with information about a file, such as its attributes and location on the storage devices. Locks supply the client with privileges it needs to open a file and read or write data. The server node performs a look-up of metadata information for the requested file within the metadata space (25) of the storage area network (5). The server nodes (12) or (14) communicate granted lock information and file metadata to the requesting client node, including the location of the data blocks making up the file. Once the client node holds a distributed lock and knows the data block location(s), the client can access the data for the file directly from a shared storage device attached to the storage area network.

Storage subsystems of a conventional computer system, such as that shown in FIG. 1, are configured with sufficient capacity to handle a limited quantity of data. In general, data read and write requests are processed through locks granted by the server. Deletion of data from the storage subsystem is typically done manually. Data may be deleted for various reasons.

In a data streaming environment, massive amounts of data are constantly written to the storage subsystem. Data must be periodically removed from the data storage subsystem to free up space for a comparable amount of new data. It is known in the art that the data in the streams cannot be permanently stored in the storage subsystem due to capacity issues, and as such, a protocol must be employed to delete data from the storage subsystem. One prior art known solution is a first in first out (FIFO) approach, wherein the most recent data is retained and the oldest data is deleted from the storage subsystem. Another prior art known solutions is a least recently used (LRU) approach, wherein the storage subsystem is treated as cache. Data is retained based on its last use. Accordingly, both of these prior art solutions automatically remove data from the storage subsystem based upon a preset protocol.

Another known approach for removal of data from the storage subsystem treats data differently based on its current importance to the overall system, and clusters together data that is anticipated to be deleted. More specifically, for each data object that is written to disk, a retention value function describing the projected value of the object over time is assigned to the object. The storage subsystem deletes the data with the lowest current retention function value as space is needed to make room for new data.

As demonstrated, distributed computer systems designed to handle large-scale data stream processing are evolving. With respect to streaming of data, or storage of large quantities of data in general, there are concerns with how to address capacity issues. In other words, data that is written to storage is generally maintained, and the data at some point is removed to make room for new data. However, the prior art addresses data storage and retention with respect to a homogenous storage system. It is known in the art for a storage subsystem to be non-homogenous, i.e. heterogeneous, wherein different storage media in the storage subsystem are grouped based upon characteristics thereof. Examples of aspects that make the storage subsystem heterogeneous include differences in storage controllers, connectivity bandwidths, etc. One form of a heterogeneous storage subsystem is known as tiered storage wherein the storage components are classified in a hierarchical manner. Tiered storage is a networked storage method where data is stored on various types of media based on a data storage environment consisting of two or more categories of storage delineated by differences between the categories of storage. Such differences generally include, price, performance, capacity, and function. Any significant difference in one or more of the four defining attributes can be sufficient to justify a separate storage tier.

Although heterogeneous storage subsystems are known in the art, to data they have not been employed with a distributed computer system that processes streaming of large quantities of data. In order to accommodate a heterogeneous storage subsystem, the different tiers in the hierarchy must be accommodated efficiently, so that they may be properly employed with the streams of data received for writing to storage.

SUMMARY OF THE INVENTION

This invention comprises a method, system, and article for managing a continuous stream of data in a non-heterogeneous storage system such that it meets the following two objectives simultaneously: First, optimal utilization of the heterogeneous storage subsystem; and second, maximizing the cumulative value of data retained by the storage system.

In a first aspect of the invention, a method is provided for allocating streaming data in a heterogeneous storage system. A computer system is configured with a server in communication with storage media for receiving a continuous input stream of data. The storage media includes at least two heterogeneous storage devices with each storage device having defining characteristics, with the storage devices categorized based upon the defined characteristics. The storage devices are sorted in an order based upon the defined characteristics, including maintaining a demand function of each of the storage devices. The input stream of data is assigned to one of the storage devices based upon the defined characteristics of the storage devices and the value of the input stream. A burn rate for each of the storage devices is dynamically calculated for each of the storage devices responsive to assignment of the input stream of data to one of the storage devices.

A system is provided with a server in communication with storage media. The storage media is configured to receive a continuous input stream of data, and includes at least two heterogeneous storage devices with each storage device having defining characteristics. The storage devices are categorized based upon the defined characteristics. A storage manager is provided to sort the storage devices in an order based upon the defined characteristics and to maintain a demand function of each of the storage devices. A data manager is provided to assign the input stream of data to one of the storage devices based upon the defined characteristics of the storage devices and the value of the input stream. The storage manager dynamically calculates a burn rate for each of the storage devices responsive to assignment of the input stream of data to one of the storage devices by the data manager.

In yet another aspect of the invention, an article is provided with a computer readable recordable carrier including computer program instructions configured to allocate streaming data in a heterogeneous storage system. Instructions are provided to configure a computer system with a server in communication with storage media to receive a continuous input stream of data. The storage media includes at least two heterogeneous storage devices with each storage device having defining characteristics. Instructions are provided to categorize the storage devices based upon the defined characteristics. Responsive to the storage device categorization, instructions are provided to sort the storage devices in an order based upon the defined characteristics and to maintain a demand function of each of the storage devices. Instructions are provided to assign the input stream of data to one of the storage devices based upon the defined characteristics of the storage devices and the value of the input stream; and to dynamically calculate a burn rate for each of the storage devices responsive to assignment of the input stream of data to one of the storage devices.

Other features and advantages of this invention will become apparent from the following detailed description of the presently preferred embodiment of the invention, taken in conjunction with the accompanying drawings.

DESCRIPTION OF THE PREFERRED EMBODIMENT

Figure 1:
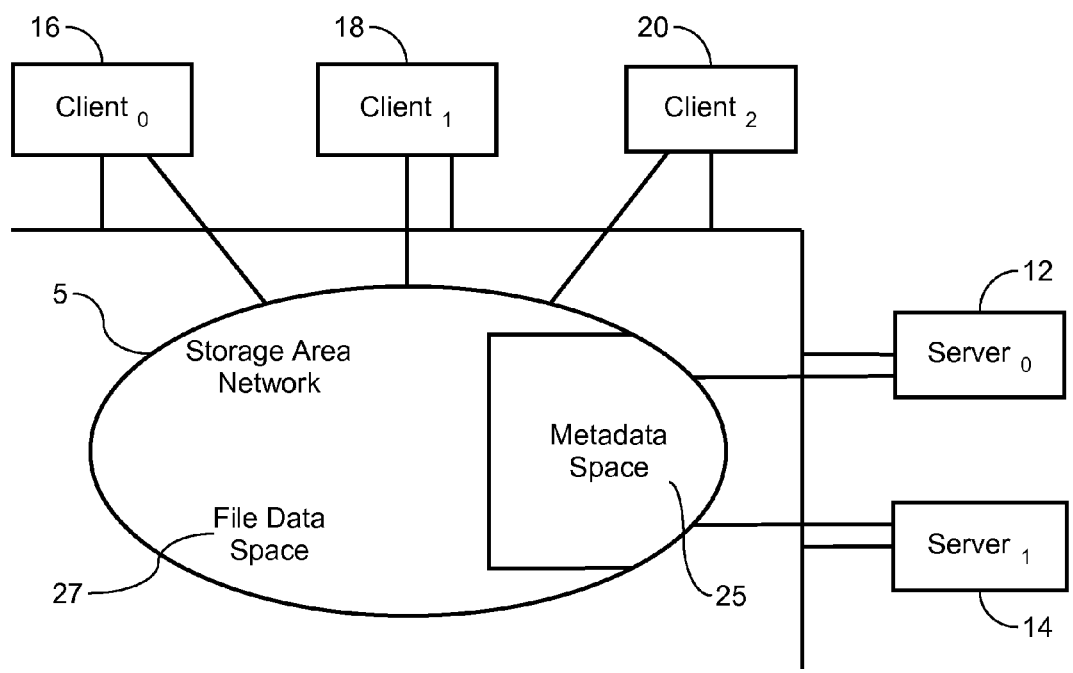
FIG. 1 is a block diagram of a prior art distributed computer system.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but merely representative of selected embodiments of the invention.

Reference throughout this specification to "a select embodiment", "one embodiment", or "an embodiment" means that a particular feature, structure, or characteristic described in connection with the embodiment is included in at least one embodiment of the present invention. Thus, appearances of the phrases "a select embodiment", "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as heterogeneous storage media, continuous stream of data, etc, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiment of the invention will be best understood by reference to the drawings, wherein like parts are designated by like numerals throughout. The following description is intended only by way of example, and simply illustrates certain select embodiments of devices, systems, and processes that are consistent with the invention as claimed herein.

Overview

The method, apparatus, and article of manufacture of the present invention provides a distinct advantage over the prior art. According to the present invention, a heterogeneous storage subsystem is employed to accommodate writing large streams of data to storage media. Data received in the data streams are processed and selectively assigned to a storage device in the storage subsystem. A burn rate function is defined for each storage device in the storage subsystem. The burn rate function represents the rate at which the retention value of data will decrease as a function of time. In addition to the burn rate, separate supply and demand counters are maintained for each device. The supply counter represents the total capacity of the storage device, and the demand counter represents the number of applications that can allocate data to the device. Based upon the values associated with the burn rate, supply and demand counter, and characteristics of the data itself, one of the evaluated storage devices in a tier in the hierarchy of the storage devices is selected for storage of the data.

Technical Details

In the following description, reference is made to the accompanying drawings that form a part hereof, and which is shown by way of illustration that specific embodiment in which the invention may be practiced. It is to be understood that other embodiments may be utilized as structural changes may be made without departing from the spirit and scope of the present invention.

Data generated by each application has a retention value. There are several techniques to assign retention values using attributes of the data. In addition to the data retention value, each application that generates the data has a service level objective that is defined in terms of performance, security, and availability requirements. A service level objective also referred to hereinafter as SLO, is a parameter to measure the performance of the service being provided and defines the importance of the data. In one embodiment, the SLO may be comprised of one or more quality of service measurements. A service level agreement, also referred to hereinafter as SLA, is an agreement that specifies what service is to be provided, how the service is supported, and performance and responsibilities of the parties involved. Accordingly, the SLO is a specific measurable characteristic of the SLA, wherein the SLO pertains to performance of service(s) by an application with respect to associated data.

In a storage network, one or more classes of storage media are employed to store and retain data thereon through the use of one or more associated applications. The capacity of the storage media in the network is static. Capacity can be increased by adding additional storage media to the storage network. Similarly, capacity for storage can be provided by removing or otherwise deleting data from storage media that is old and stale, and no longer required to be retained. It is recognized that over time some data decays as the data becomes stale and less important. Accordingly, it may be desirable to remove decayed data from storage media after a set period of time.

To address removal of data from storage media, each storage device in a storage subsystem has a defined burn rate function. This function represents the rate at which the retention value of data will decrease as a function of time. In one embodiment, the initial burn rate for a storage device can be proportional to its dollar cost or depreciation of the physical device. The burn rate of each individual storage devices changes over time. The burn rate of a storage device is a mathematical function that represents the rate at which data allocated on that device will lose its retention value. In other words, the rate in which data is retained in storage decays as a function of time. The burn rate is defined either by capacity or bandwidth of the storage device. In one embodiment, the burn rate is defined as follows:

$$\text{Burn Rate} = [(\alpha)(\text{time}) + C] \times R$$

where, C is a constant, R is the capacity of storage used by the application, and $\alpha$ is a value proportional to the capabilities of the storage device in a specific tier. In one embodiment, $\alpha$ and R are both defined in terms of storage capacity allocated. Similarly, in another embodiment, $\alpha$ and R are both defined in terms of the rate at which storage is allocated to an application.

In addition to the burn rate, each storage device in the storage subsystem maintains two counters. A first counter is a supply counter, and a second counter is a demand counter. The supply counter represents the total capacity of the storage device. The demand counter represents the number of applications that can allocate data on the associated storage device.

Figure 2:
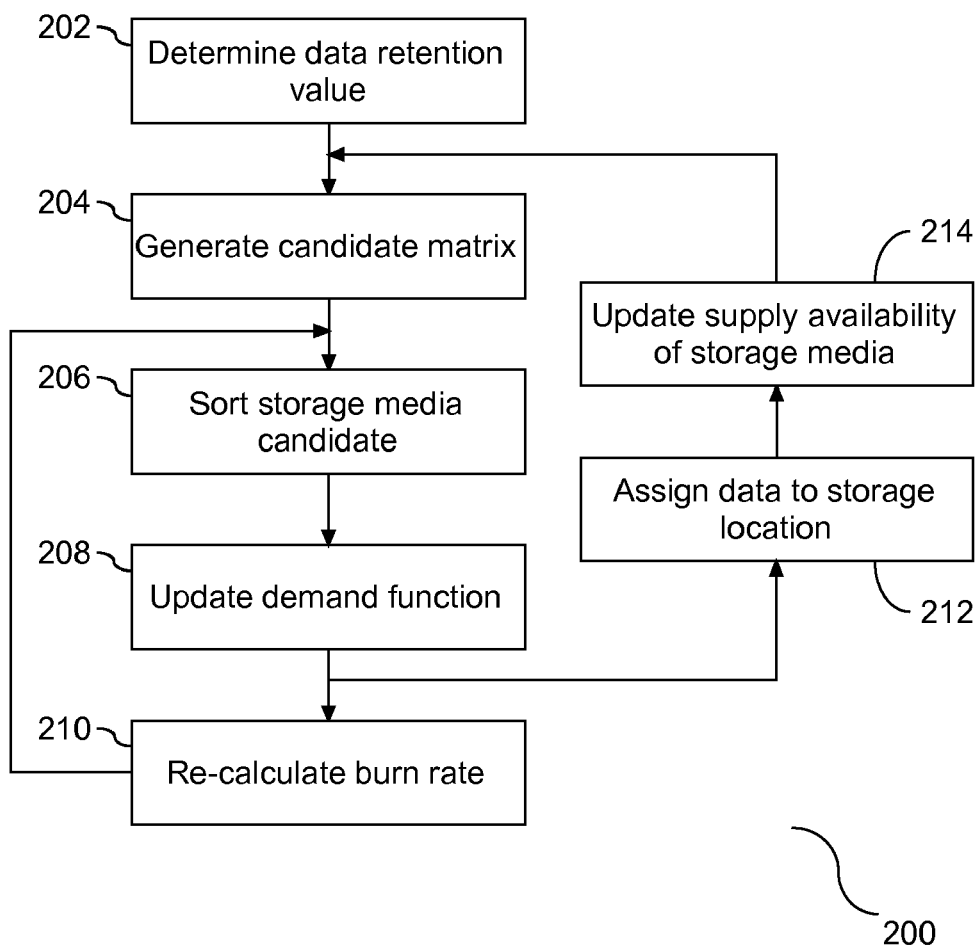
FIG. 2 is a flow chart illustrating assignment of data to storage media according to the preferred embodiment of this invention, and is suggested for printing on the first page of the issued patent.

Intuitively, the burn-rate of a storage device is dependent on the ratio of its supply, i.e. capacity or bandwidth, with the total capacity or bandwidth that can be potentially deployed by the application using the storage system, otherwise known as the demand. The combination of the burn rate, the demand counter, and the supply counter are employed to determine assignment of data from an incoming stream to storage media in a heterogeneous storage system. FIG. 2 is a flow chart (200) illustrating assignment of data to storage media. It should be noted that there are two optimization loops that operate within the data assignment system. A first loop tracks access characteristics to re-calculate a feasibility matrix of storage media candidate locations. A second loop tracks burn rates of the storage devices and re-evaluates their values based on both supply and demand. Prior to entry into either the first or the second loop, the data retention value is determined (202). Data generated by each application has a retention value. There are several techniques that may be employed to assign retention value using attributes of data. For example, different data that is received has different value based upon usefulness. In one embodiment, the retention value may be associated with a service level agreement of a service level objective. Although the technique employed for assigning retention value is outside the scope of the invention, the retention value affects assignment of data to a storage device. Similarly, regardless of the retention value assigned to the data, the data decays over time. The current value of the data is subject to a decreasing function with a factor of time. As time progresses, the retention value associated with the data decreases. The goal is to maximize the value of the aggregate data retained in the storage media. Accordingly, prior to entering with either the first or second loop the retention value of the received data is determined.

Following step (202), the first of the two loops is entered. It should be noted that the second loop is a part of the first loop. Upon entering the first loop, a storage media candidate matrix is generated (204). Each storage media in the storage system is a candidate to receive the incoming data from the data stream. The matrix is a listing of all of the storage media that may receive the data from the incoming data stream. As noted above, each storage media in the storage system has a burn rate that is associated therewith. In one embodiment, the burn rate is dynamic in that it constantly changes based upon data received, data retained, and data removed from the storage media. Following generation of the storage media candidate matrix, the second of the two loops is entered. For each application of data received in the incoming data stream, candidate storage media for the associated data are sorted (206). In one embodiment, the sorting of the storage media is based upon the associated burn rate. For example, the storage media may be sorted in ascending order based upon the respective burn rates. Similarly, the storage media may be sorted in descending order based upon the respective burn rates. Prior to assignment of data from the incoming data stream to any one specific storage media, a demand function for each storage device is updated (208). Assignment of received data to storage media is based upon the burn rate of the storage media, the demand function of the storage media, and the retention value of the data itself. The burn rate is proportional to the supply and demand of the storage capacity, and the retention value of the data is inherent to the data itself. The goal is to maximize the value of the data retained in the storage media. Following the update of the demand of the storage media, the burn rate for the storage media is recalculated (210) based upon the changes in supply and demand. Steps (206), (208), and (210) constitute the second loop. Accordingly, assignment of data to storage media is dynamically determined by the constant changes in both the burn rate and the supply and demand capacity of the storage device.

Following step (208), data from the data stream is assigned to a selected storage media (212). The assigned data is based upon the sorted matrix at step (204). As noted above at step (208) and as a part of the first loop, the demand function for each storage device is updated. The demand of a storage device represents the number of applications that can allocate data on the device. In a similar respect and as a part of the second loop, the supply availability of the storage devices is updated (214). Supply represents the total capacity of the device. As such, it follows that the supply of the storage device requires an update following assignment at step (212). Once the supply availability is updated, the process returns to step (204) to sort the matrix of storage devices in the storage network. Accordingly, the first loop addresses maintaining a demand counter and the second loop addresses maintaining a supply counter, each of the counters associated with each of the individual storage devices in the storage network.

In one embodiment, the burn-rate of the device will load balance data allocation across storage tiers in the hierarchical storage system. In the beginning, the least expensive devices will receive data for storage as long as they meet the service level agreement or objective for security and availability. As the demand of the individual storage devices exceeds supply, their burn-rate will increase. In one embodiment, the increased burn-rate will direct data to one or more different storage devices in the network whose burn-rate was originally higher, but is currently lower than the originally least expensive storage device. Similarly, in a lightly loaded system, the data is allocated on expensive and faster storage devices. As the load starts increasing on the expensive and faster devices, data is allocated towards slower and less expensive devices that have a lower burn-rate.

In general, application data is allocated to a storage media location which is a member of the feasibility matrix for the application and has the lowest burn-rate in the candidate list. By allocating the data to the storage media with the lowest burn-rate, the data will be stored for the longest period of time available. The longevity of the data storage yields a maximum value of data retained in the system, where value is the summation of individual object values in the system. However, as noted above, the burn rate, and supply and demand characteristics are periodically re-evaluated. This makes all three factors dynamic in nature. Allocation of data to storage media is re-evaluated based upon the following factors: a change in the device burn rate, a change in the application access properties, such as capacity and access bandwidth, device failure, etc. Accordingly, allocation of data to storage media is dynamic and reflects in-time changes to data allocation and storage.

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For purposes of this description, a computer-usable or computer readable medium can be any apparatus that can contain, store, communicate, propagate, or transport the program for use by or in connection with the instruction execution system, apparatus, or device.

Figure 3:
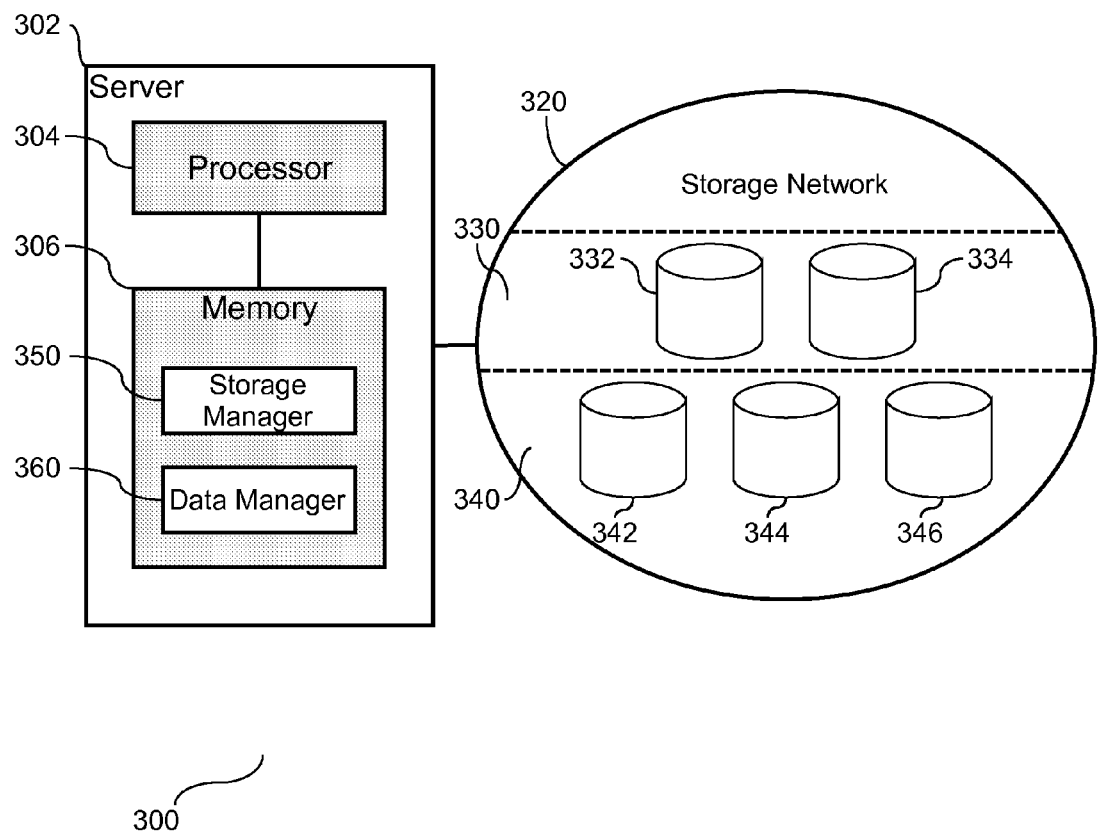
FIG. 3 is a block diagram illustrating a data allocation tool in a computer system configured to receive a continuous stream of data and to store the received data in a selected storage media in a heterogeneous storage system.

Similarly, in one embodiment the invention is implemented in hardware. FIG. 3 is a block diagram (300) illustrating a data allocation tool in a computer system configured to received a continuous stream of data and to store the received data in a selected storage media in a heterogeneous storage system. The illustration shows a server (302) with a processor unit (304) coupled to memory (306) by a bus structure (308), and in communication with a storage network (320). The storage network (320) is shown with two tiers of storage media (330) and (340), with a first tier (330) having storage devices (332) and (334) and a second tier (340) having storage devices (342), (344), and (346). Each storage device (332) and (334) in the first tier (330) has its own defining characteristics. Similarly, each storage device (342), (344), and (346) in the second tier (340) has its own defining characteristics. In one embodiment, the storage devices are categorized in the storage network (320) based upon the associated defining characteristics.

A set of managers (350) and (360) are provided in memory (306) to support management of storage of data received by the server (302). The first of the managers (350) is a storage manager, and it is responsible for sorting each of the storage devices in the storage network (320). The storage manager (350) sorts the different storage devices based upon the defined characteristics of the devices. The second of the managers (360) is a data manager, and it is responsible for assigning the input stream of data to one of the storage devices in the storage network (320).

The storage manager (350) maintains a demand function for each of the storage devices, and dynamically updates supply availability of each of the storage devices in the storage network (320) responsive to assignment of received data to one of the storage devices in the storage network (320). Responsive to assignment of data to a select storage device in the storage network (320) by the data manager (360), the supply for the select storage device is lowered by the storage manager (350). In one embodiment, the storage manager (350) dynamically adds one or more new storage devices to the storage network (320) in communication with the server (302) for load balancing input data streams and ensuring uniform load across all of the storage devices in the network (320). Accordingly, the storage manager (350) primarily manages the storage devices in the storage network (320).

Conversely, the data manager (360) assigns the data to one of the storage devices in the storage network (320) based upon the defined characteristics of the storage devices and a value of the data received by the server (302). The storage manager (350) functions together with the data manager (350) to dynamically calculate a burn rate for each of the storage devices in response to assignment of data by the data manager (360) to one of the storage devices. Similarly, the data manager (360) dynamically assigns new data from the received data to one of the storage devices based upon an update to the burn-rates of the storage devices. The data manager (360) employs the burn rate as a tool for data management. The data manager (360) increases the burn rate of at least one of the storage devices in a ration proportional to an increase in demand for the storage device. Based upon a cost benefit evaluation, the data manager (360) selects the storage device in the storage network (320) with the lowest burn rate that meets data access requirements for storage of data received by the server (302), so as to yield a maximum value of data retained in the system.

In one embodiment, the storage manager (350) and the data manager (360) are both in the memory (306) of the server (302). Similarly, in one embodiment, the storage manager (350) is in communication with the data manager. Although the system shown herein is a single server (302) with a processor (304), memory (306) and a storage network (320), in one embodiment, the invention may be enlarged to encompass additional client machines and/or servers in the system with access to the storage network (320). Similarly, the storage network (320) may be enlarged to include a larger quantity or smaller quantity of storage devices in each tier (330) and (340), as well as a larger quantity of tiers in the hierarchical structure of the storage network (320).

In the example shown herein, the storage manager (350) and the data manager (360) are shown residing in memory (306), and utilize instructions in a computer readable medium to manage assignment of data to storage devices in the storage network (320). In one embodiment, the storage and data managers (350) and (360), respectively, may reside as hardware tools external to memory (306), or they may be implemented as a combination of hardware and software in the computer system. Accordingly, the storage and data managers (350) and (360), respectively, may be implemented as a software tool or a hardware tool for assignment of data to one or more storage devices in a hierarchical construction of a storage network (320).

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, infrared, or semiconductor system (or apparatus or device) or a propagation medium. Examples of a computer-readable medium include, but are not limited to, a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code includes at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system. Instructions are provided in the software implementations to support the hierarchical structure of the storage network and assignment of data to the storage devices based upon categorization of the devices and associated characteristics of both the devices and the data.

Advantages Over the Prior Art

Data from a continuous stream of incoming data is assigned to one or more storage devices based upon the characteristics of the storage devices, including placement of the storage devices in a hierarchical structure, supply, and demand. The data is retained for a select period of time based upon a burn rate associated with the assigned storage device. The burn rate, supply, and demand are all subject to dynamic change based upon receipt and assignment of data to one or more storage devices in the storage network. Assignment of data is opaque to assignment to the storage device. Accordingly, streams of data are allocated to one or more storage devices in a heterogeneous storage system based upon dynamically changing factors associated with storage devices, wherein the changes are a reflection of assignment of data thereto.

Alternative Embodiments

It will be appreciated that, although specific embodiments of the invention have been described herein for purposes of illustration, various modifications may be made without departing from the spirit and scope of the invention. In particular, in one embodiment, the data received for assignment to a storage device may include an associated characteristic, such as a retention value, which is a factor in storage device assignment. Accordingly, the scope of protection of this invention is limited only by the following claims and their equivalents.

We claim:

1. A method for allocating streaming data in a heterogeneous storage system, comprising:
   configuring a computer system with a server in communication with storage media for receiving a continuous input stream of data, wherein said storage media includes at least two heterogeneous storage devices with each storage device having defining characteristics, said characteristics include a burn rate representing a rate at which data stored to a storage device loses its retention value, a demand counter representing a number of applications that can allocate data on the storage device, and a supply counter representing a total capacity of the storage device;
   sorting said storage devices in an order based upon said defined characteristics and maintaining a demand function of each of said storage devices;
   assigning the input stream of data to one of said storage devices based upon said defined characteristics of said storage devices, including a combination of the burn rate, the demand counter, and the supply counter, and a value of said input stream; and
   dynamically calculating the burn rate for each of said storage devices responsive to assignment of the input stream of data to one of said storage devices.

2. The method of claim 1, further comprising dynamically updating supply availability of each said storage devices responsive to assignment of the input stream of data to one of said storage devices.

3. The method of claim 1, wherein the step of assigning the input stream of data to one of said storage devices includes dynamic assignment of new data from said input stream based on an update to the device burn rate.

4. The method of claim 3, further comprising lowering supply for a storage device with said assignment of an input stream of data to said storage device.

5. The method of claim 3, further comprising increasing said burn rate of one of said storage devices proportional to increasing demand to said storage device.

6. The method of claim 1, wherein the step of assigning the input stream of data to one of said storage devices includes selecting said storage device with a lowest burn rate that meets data access requirements.

7. The method of claim 1, further comprising dynamically adding a new storage device in communication with said server for load balancing input data streams and ensuring uniform load across all the storage devices.

8. A system comprising:
   a server in communication with storage media, said storage media configured to receive a continuous input stream of data, and said storage media includes at least two heterogeneous storage devices with each storage device having defining characteristics, said characteristics include a burn rate representing a rate at which data stored to a storage device loses its retention value, a demand counter representing a number of applications that can allocate data on the storage device, and a supply counter representing a total capacity of the storage device;

a storage manager to sort said storage devices in an order based upon said defined characteristics and to maintain a demand function of each of said storage devices;

a data manager to assign the input stream of data to one of said storage devices based upon said defined characteristics of said storage devices, including a combination of the burn rate, the demand counter, and the supply counter, and a value of said input stream; and said storage manager to dynamically calculate the burn rate for each of said storage devices responsive to assignment of the input stream of data to one of said storage devices by said data manager.

9. The system of claim 8, further comprising said storage manager to dynamically update supply availability of each said storage devices responsive to assignment of the input stream of data to one of said storage devices.

10. The system of claim 8, wherein the data manager dynamically assigns new data to one of said storage devices from said input stream based on an update to the said device burn rate.

11. The system of claim 10, further comprising said storage manager to lower supply for a storage device with said assignment of an input stream of data to said storage device.

12. The system of claim 10, further comprising said data manager to increasing said burn rate of a storage device proportional to a demand increase to said storage device.

13. The system of claim 8, wherein the data manager selects said storage device with a lowest burn rate that meets data access requirements.

14. The system of claim 8, further comprising said storage manager to dynamically add a new storage device in communication with said server to load balance input data streams and ensure uniform load across all the storage devices.

15. An article comprising:

a computer readable recordable carrier including computer program instructions configured to allocate streaming data in a heterogeneous storage system, comprising:

instructions to configure a computer system with a server in communication with storage media to receive a continuous input stream of data, wherein said storage media includes at least two heterogeneous storage devices with each storage device having defining characteristics, said characteristics include a burn rate representing a rate at which data stored to a storage device loses its retention value, a demand counter representing a number of applications that can allocate data on the storage device, and a supply counter representing a total capacity of the storage device;

instructions to sort said storage devices in an order based upon said defined characteristics and to maintain a demand function of each of said storage devices;

instructions to assign the input stream of data to one of said storage devices based upon said defined characteristics of said storage devices, including a combination of the burn rate, the demand counter, and the supply counter, and a value of said input stream; and instructions to dynamically calculate the burn rate for each of said storage devices responsive to assignment of the input stream of data to one of said storage devices.

16. The article of claim 15, further comprising instructions to dynamically update supply availability of each said storage devices responsive to assignment of the input stream of data to one of said storage devices.

17. The article of claim 15, wherein the instructions to assign the input stream of data to one of said storage devices includes dynamic assignment of new data from said input stream based on an update to the said device burn rate.

18. The article of claim 17, further comprising instructions to lower supply for a storage device with said assignment of an input stream of data to said storage device and instructions to increase said burn rate of a storage device proportional to an increase in demand to said storage device.

19. The article of claim 15, wherein the instructions to assign the input stream of data to one of said storage devices includes selection of said storage device with a lowest burn rate that meets data access requirements.

20. The article of claim 15, further comprising instructions to dynamically add a new storage device in communication with said server to load balance input data streams and ensure uniform load across all the storage devices.

* * * * *